Figure 1:
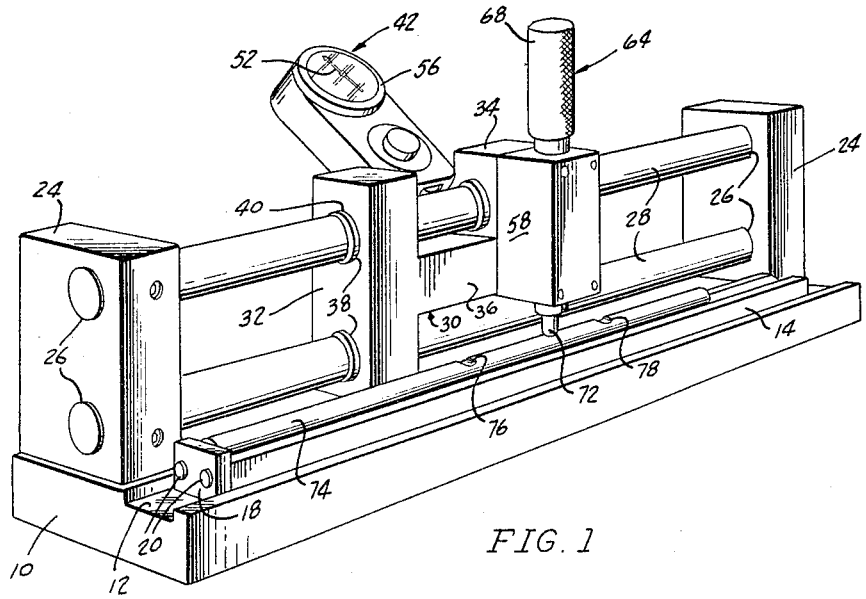

Sept. 20, 1966  W. P. KLAASSEN  3,273,249

LINEAR GAUGE

Filed Sept. 22, 1964  2 Sheets-Sheet 1

INVENTOR
WILLIAM P. KLAASSEN
BY Beaman & Beaman
ATTORNEYS

Sept. 20, 1966    W. P. KLAASSEN    3,273,249
LINEAR GAUGE

Filed Sept. 22, 1964    2 Sheets-Sheet 2

INVENTOR
WILLIAM P. KLAASSEN
BY Beaman & Beaman
ATTORNEYS

United States Patent Office 3,273,249
Patented Sept. 20, 1966

3,273,249
LINEAR GAUGE
William P. Klaassen, Brooklyn, Mich., assignor to Teer Wickwire & Company, Jackson, Mich., a corporation of Michigan
Filed Sept. 22, 1964, Ser. No. 398,250
2 Claims. (Cl. 33—172)

The invention pertains to a gauge, and particularly relates to a linear gauge adapted to measure and indicate linear distances.

While a number of gauging devices are currently available for accurately measuring internal and external diameters, and the like, inexpensive measuring apparatus for very accurately determining linear lengths, or the distance between predetermined locations defined on a member, is not presently available. If, for instance, it is desired to very accurately measure the length of a shaft which is to be eighteen inches with a tolerance of plus or minus .001 inch, it is necessary to employ a surface plate, gauge blocks, and a vernier to determine such a dimension, and the possibility of error is very likely due to the presence of the plurality of components. Also, when using a vernier it is difficult to produce an accurate reading of less than .001 inch.

If the spacing between a pair of holes defined in an elongated shaft is of such a dimension whereby conventional micrometers, or other hand measuring devices, cannot be used, it is necessary to employ a surface plate, gauge blocks, vernier and "plugs" within the holes in order to provide an accurate measurement. Thus, with conventional equipment it will be appreciated that there are many types of measurements which are too large to be handled by conventional size calipers or micrometers and which may only be made by employing complicated "built-up" gauge systems.

It is an object of the invention to provide a gauge capable of making linear measurements of considerable length quickly and very accurately.

A further object of the invention is to provide a simplified linear gauge capable of very accurately making linear measurements on the article to be measured and wherein the operation of the apparatus is such as to be readily accomplished by nonskilled personnel.

Another object of the invention is to provide a linear gauge employing a track, and a carriage movably mounted thereon, wherein distance indicating means are directly mounted upon the carriage and indicate the movement of the carriage on the track.

A further object of the invention is to provide a linear gauge including a carriage movably mounted upon a track wherein means for engaging the article to be measured are removably mounted on the carriage and wherein a configuration of article engaging means which is most desirable for the particular measurement being taken may be readily employed.

Figure 2:
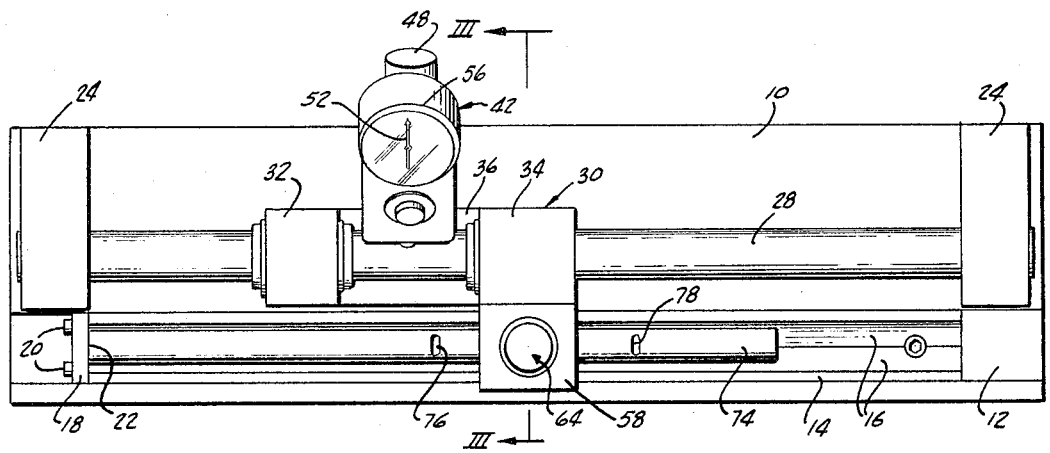
Figures 3, 6, 7:
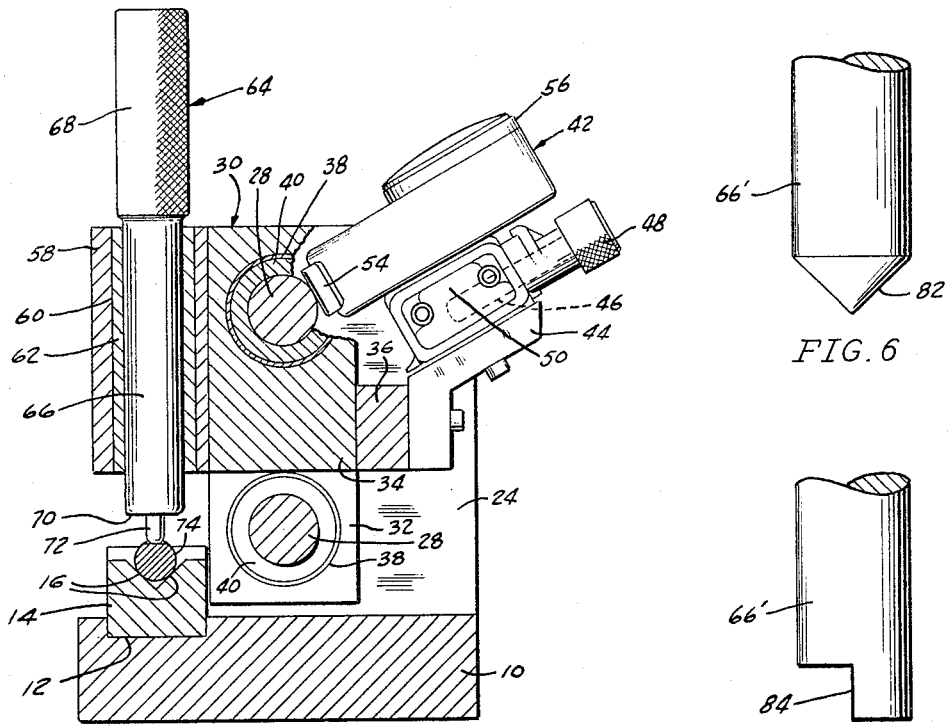

These and other objects of the invention arising from the details and relationships of the components of an embodiment thereof will be apparent from the following description and accompanying drawings wherein:

FIG. 1 is a front and side perspective view of a linear gauge in accord with the invention, FIG. 2 is a plan view of the gauge of FIG. 1, FIG. 3 is an elevational, sectional view taken through the carriage and article engaging probe means support bore along section III—III of FIG. 2 upon the probe end engaging a groove in article to be measured, a portion of the carriage being broken away to illustrate the adjustable mount for the distance indicating means, and FIGS. 4 through 7 are enlarged, detail, elevational views of various probe end configurations which may be formed on the article engaging end of the probe.

The linear gauge, in accord with the invention, includes a base 10, being shown in the illustrated embodiment of a rectangular form. The base 10 will usually be machined of steel or cast iron and includes an elongated, channel-shaped recess 12 defined the length thereof.

An elongated V-block 14 is affixed within the base recess 12 by screws, or other conventional fastening means, not shown. The V-block 14 includes a pair of V-surfaces 16 adapted to receive the article to be measured. The V-surfaces 16 may be considered to be oppositely disposed to each other, whereby the plane in which the line of intersection of the surfaces lies and which is equally angularly disposed to the surfaces may be considered to be the "axis" plane of the V-block. Such a plane would be perpendicular to the surface upon which the base 10 is supported. A reference block 18 is affixed to the left end of the V-block, FIG. 1, by screws 20, and defines an abutment surface 22 to aid in locating the article to be measured within V-block 14.

A pair of track supporting blocks 24 are fixed upon the base 10, a block being disposed adjacent each end thereof. Each of the blocks 24 is provided with cylindrical, parallel bores 26, whereby spaced, parallel, track shafts 28 may be mounted upon the base and vertically disposed thereabove. Setscrews 30 received within threaded holes affix the shafts 28 within the bores 26. The shafts 28 are parallel to each other and parallel to the block 14 and the "axis" plane defined by the surfaces 16. Preferably, the shafts 28 are of a cylindrical configuration.

A carriage 30 is mounted upon the track shafts 28 for axial, slidable movement thereon. The carriage 30 is of an inverted "h" configuration, including vertically disposed portions 32 and 34 interconnected by a horizontally disposed portion 36. A pair of bearing receiving bores 38 are defined in the portion 32, and a single bearing receiving bore 38 is defined in the portion 34. Suitable annular bearing 40 are disposed within the carriage bores 38, whereby the carriage 30 may be very accurately supported upon the shafts 28 and yet is easily slidable thereon in the axial, longitudinal direction of the shafts. If desired, a high grade antifriction linear bearing employing ball bearings may be employed for this purpose.

A distance indicating device 42 is mounted upon the carriage portion 36 by means of a bracket 44, FIG. 3. A screw 46 is mounted upon the bracket 44 adapted to be rotated by a knob 48. The screw 46 adjustably positions a slide 50 upon which the distance indicating device 42 is mounted. The distance indicating device may be of the type commercially available as the "TRAV-A-DIAL" manufactured by Southwestern Industries, Inc.

The distance indicating device 42 includes a rotatable needle 52 which is appropriately geared to a rolling drive wheel 54 having a high friction periphery which engages the upper track shaft 28, FIG. 3. The indicator 42 also includes a dial 56 having indicia located thereon. The dial 56 is rotatably mounted with respect to the indicator housing wherein the indicia thereof may be oriented as desired with respect to the needle 52 in the manner well-known in the gauge art.

The degree of frictional engagement between the rolling drive wheel 54 and the upper track shaft 28 is determined by the adjustment of the screw 46 by knob 48 wherein movement of the indicator 42 toward and away from the upper shaft 28 is achieved.

The carriage 30 supports a block 58 mounted on portion 34 in which is defined a vertically disposed bore 60 containing a cylindrical guide bushing 62. The axis of the guide bushing 62 is so disposed as to lie within the V-block "axis" plane defined by the V-block surfaces 16 wherein the axis of the bushing is perpendicularly disposed to the longitudinal length of the V-block 14.

The cylindrical bushing 62 constitutes the holder for the desired article engaging means, or probe, 64, employed to contact the article to be measured. The article engaging means, or probe, is preferably of a general configuration as shown in FIG. 3, including a cylindrical portion 66 adapted to be closely, slidably received within the bushing 62. The upper end of the probe is provided with a knurled handle 68, and the lower end 70 thereof is formed of a configuration appropriate to the configuration of the groove, surface, or hole being measured. In FIG. 3 the lower end 70 of the probe 64 is in the form of a projection 72 having a spherical end of relatively small dimension.

In use, the article to be measured, such as a shaft, rod, or other elongated member is placed within the V-block 14 to rest upon the surfaces 16. In the illustrated embodiment, the article to be measured is in the form of a cylindrical rod 74 having a pair of spaced, concave grooves 76 and 78 defined therein. Assuming it is desired to measure the distance between the grooves 76 and 78 in the axial direction with respect to the rod 74, the operator places the probe having an end 70 which conforms to the configuration of the grooves 76 and 78 within the bushing 62. The operator pushes the rod 74 to the left, FIG. 2, to insure engagement of the left end of the rod with the abutment surface 22. The carriage 30 is then positioned upon the track shafts 28 wherein the probe 64 may be lowered into the rod groove 76. As the configuration of the projection 72 of the probe conforms to the groove, the positioning of the carriage will be definite. The distance indicator 42 is then "zeroed" by rotating the dial 56 so that the zero reading aligns with the pointer of the needle 52. The operator then raises the probe 64 in an upward, vertical direction to remove the probe projection 72 from the recess 76, but not sufficiently to remove portion 66 from bushing 62, and, by means of the probe handle 68, moves the carriage to the right to position the probe projection 72 over the right groove 78. The probe is lowered in bushing 62 and upon the probe projection 72 being firmly received within the groove 78, the distance between the grooves 76 and 78 may be accurately and directly read upon the dial 56. In that the dial 56 is capable of denoting movement of the carriage 30 upon the shafts 28 of less than .001 inch, the distance between the grooves 76 and 78 may be very accurately and quickly determined. Of course, care must be taken to insure that the rod 74 is not moved relative to V-block 14 between readings and surface 22 is helpful in preventing such movement.

Figure 4:
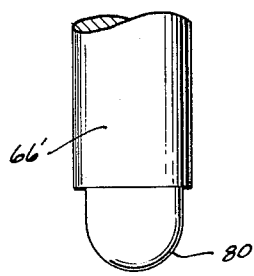
Figure 5:
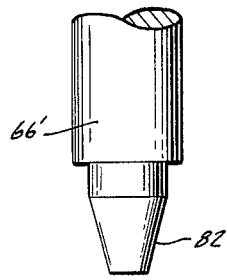

The probe projection 80, shown in FIG. 4, may be used to measure larger concave grooves or depressions than those shown in FIGS. 1, 2 and 3, or used to measure other convex configurations which correspond to the confiuration of the probe projection surface. The probe projection configurations of FIGS. 5 and 6 include conical surfaces 82 which permit these probes to be used to accurately measure the distances between holes defined in the article to be measured. The probe shown in FIG. 7 includes planar surface 84 aligned with the center of the probe portion 66' wherein this probe may be used to determine the distance between radial shoulders defined upon a shaft or other member located within the V-block 14 or used to measure the lengths of rods and shafts.

In that the probe 64 may be readily removed from the carriage and a new probe inserted into the bushing 62, the gauge may be very quickly adapted to measure different types of components, such as grooves, holes, shoulders, etc. As the raising and lowering of the probe is accomplished manually, neither the article to be measured nor the probe is likely to be damaged and the apparatus readily lends itself to most types of linear measuring. It will be appreciated that it is not necessary to the operation of the machine that the end of the article being measured engage the abutment surface 22, it only being necessary that no axial displacement of the article to be measured take place between the first and second measurements, and the use of the abutment surface 22 reduces the likelihood of such accidential movement of the article being measured.

It will be appreciated that the invention produces a linear gauge of simplified construction capable of very accurately performing measurements on a wide variety of articles. Articles of considerable length may be measured by providing a gauge apparatus having a spacing between the blocks 24 sufficient to accommodate the article to be measured. It has been the applicant's experience that the distance indicator 42 employing the friction wheel 54 upon the shaft 28 is very accurate and that no slippage or misreadings will occur if proper frictional engagement is maintained between the wheel and the upper track shaft.

It is appreciated that various modifications to the disclosed embodiment of the invention may be apparent to those skilled in the art without departing from the spirit and scope thereof, and it is intended that the invention be defined only by the scope of the following claims.

I claim:
1. A linear gauge for measuring the distance between shaped configurations defined on an elongated article comprising, in combination,
   (a) a base,
   (b) elongated article holding means mounted on said base, opposed supporting surfaces defined on said holding means defining an elongated groove adapted to support the article to be measured, said supporting surfaces defining the axis of said groove,
   (c) a linear elongated track mounted on said base disposed parallel to said groove axis,
   (d) a reference block having a reference surface mounted on said article holding means, said surface being transversely disposed to said groove axis and in alignment with said groove whereby an article to be measured disposed within said groove may abut against said surface and be related in a predetermined manner to said article holding means,
   (e) a carriage supported on said track for slidable movement thereon in the longitudinal direction of said track, a cylindrical bore defined in said carriage having a vertically disposed axis intersecting the axis of said groove,
   (f) an article engaging probe having a cylindrical body surface, a shaped article engaging end defined on one end of said probe having a configuration complementary to the configuration defined on the article to be measured and a handle defined on the other end of said probe, said probe being closely freely slidably received within said cylindrical bore for selective movement of said shaped article engaging end toward and away from said groove axis, and
   (g) a direct reading dial indicator mounted upon said carriage, said dial indicator including a rolling drive wheel engaging said track for sensing movement of said carriage on said track, said movement being directly indicated on said dial indicator.
2. In a linear gauge as in claim 1 wherein:
   (a) rotatable screw means are mounted on said carriage, said dial indicator and drive wheel being mounted on said screw means for adjustment toward and away from said track whereby the frictional en- gagement of said drive wheel and track may be regulated.

References Cited by the Examiner
UNITED STATES PATENTS

| | | | |
|---|---|---|---|
| 1,003,043 | 10/1911 | Goughnour | 33—189 |
| 2,237,515 | 4/1941 | Williams | 33—125 |
| 2,546,110 | 3/1951 | Puterbaugh | 33—169 |
| 2,663,598 | 12/1953 | Verderber | 33—141 X |

FOREIGN PATENTS

| | | |
|---|---|---|
| 674,137 | 11/1963 | Canada. |
| 343,751 | 2/1960 | Switzerland. |

LEONARD FORMAN, *Primary Examiner.*

ISAAC LISANN, *Examiner.*

B. DONAHUE, *Assistant Examiner.*